(12) United States Patent
Yousef et al.

(10) Patent No.: US 12,716,458 B2
(45) Date of Patent: Aug. 25, 2026

(54) LOCKING SYSTEM FOR A VERTICAL CABLE SHUTTLE

(71) Applicant: Honeywell Safety Products USA Inc., Charlotte, NC (US)

(72) Inventors: Moutasem Yousef, Brno (CZ); Jan Macka, Brno (CZ); Vaclav Hruza, Brno (CZ)

(73) Assignee: Honeywell Safety Products USA, Inc., Latham, NY (US)

( * ) Notice: Subject to any disclaimer, the term of this patent is extended or adjusted under 35 U.S.C. 154(b) by 581 days.

(21) Appl. No.: 18/217,030

(22) Filed: Jun. 30, 2023

(65) Prior Publication Data

US 2025/0003459 A1 Jan. 2, 2025

(51) Int. Cl.

| | |
|---|---|
| ***F16D 63/00*** | (2006.01) |
| ***A62B 35/04*** | (2006.01) |
| *A62B 35/00* | (2006.01) |
| *F16D 121/14* | (2012.01) |
| *F16D 125/28* | (2012.01) |

(52) U.S. Cl.

CPC ............ *F16D 63/008* (2013.01); *A62B 35/04* (2013.01); *A62B 35/0081* (2013.01); *F16D 2121/14* (2013.01); *F16D 2125/28* (2013.01); *F16D 2200/0017* (2013.01); *F16D 2200/0021* (2013.01)

(58) Field of Classification Search

CPC ............... F16D 63/008; F16D 2121/14; F16D 2125/28; F16D 2200/0017; F16D 2200/0021; A62B 35/04; A62B 35/0081

USPC .................... 188/65.1–65.5; 182/5, 191, 192

See application file for complete search history.

(56) References Cited

U.S. PATENT DOCUMENTS 4,560,029 A * 12/1985 Dalmaso ............. E04G 21/3261 182/112
4,580,658 A * 4/1986 Brda ........................ A62B 1/14 182/5
5,934,408 A * 8/1999 Flux ....................... A62B 35/04 182/5

(Continued)

FOREIGN PATENT DOCUMENTS

CN 1197401 A 10/1998
GB 2441140 A 2/2008

OTHER PUBLICATIONS

Extended European Search Report Mailed on Dec. 6, 2024 for EP Application No. 24178009, 9 page(s).

(Continued)

*Primary Examiner* — Christopher P Schwartz
(74) *Attorney, Agent, or Firm* — Fredrikson & Byron, P.A.

(57) ABSTRACT

A locking system for a vertical cable shuttle is disclosed. The locking system comprises a housing defining a guide path and slideably attached to a guide member. A braking lever configured to engage the guide member. The braking lever comprises a shock absorber fabricated along the braking lever and configured to absorb shocks during a fall. Further, a braking configured independent from the braking lever. The braking element is a logarithmic spiral structure configured to rotate into engagement with the guide member during the fall, and defines a constant slope angle for gripping of the guide member. The braking element having a braking surface to provide contact surface area with the guide member during the fall.

20 Claims, 9 Drawing Sheets

(56) References Cited

U.S. PATENT DOCUMENTS

| | | | | |
|---|---|---|---|---|
| 6,056,086 | A | 5/2000 | Gortan et al. | |
| D710,678 | S | 8/2014 | Miller | |
| D710,679 | S | 8/2014 | Miller | |
| 9,636,528 | B2 | 5/2017 | Casebolt et al. | |
| 10,843,038 | B1 * | 11/2020 | Gajewski | A63B 21/4033 |
| 10,953,247 | B2 | 3/2021 | Muessig | |
| 11,406,851 | B2 | 8/2022 | Novotny et al. | |
| 11,781,610 | B2 * | 10/2023 | Kils | F16D 59/00 188/65.1 |
| 2006/0102421 | A1 | 5/2006 | Dionne | |
| 2010/0126802 | A1 | 5/2010 | Delaittre et al. | |
| 2012/0103725 | A1 * | 5/2012 | Johansson | A62B 1/14 182/5 |
| 2016/0130875 | A1 * | 5/2016 | Hwang | A62B 1/14 182/5 |
| 2021/0220680 | A1 | 7/2021 | Novotny et al. | |
| 2024/0001501 | A1 * | 1/2024 | Olivotto | F16D 65/18 |
| 2024/0376943 | A1 * | 11/2024 | Cotic | A62B 35/0081 |

OTHER PUBLICATIONS

Honeywell, “Söll Vi-Go Vertical Cable System”, retrieved from the Internet at <https://sps.honeywell.com/au/en/products/safety/fall-protection/anchorage-systems/miller-vi-go-ladder-climbing-safety-systems-cable> on Nov. 14, 2023, 2 pages.

Wikipedia, “Logarithmic spiral”, retrieved from the Internet at <https://en.wikipedia.org/wiki/Logarithmic_spiral> on Nov. 14, 2023, 6 pages.

Youtube, “Vi-Go Vertical Fall Arrest Cable System for Existing ladder—Safety At Height”, retrieved from the Internet at <https://www.youtube.com/watch?v=juvU2Vri0pk> on Nov. 14, 2023, 2 pages.

* cited by examiner

LOCKING SYSTEM FOR A VERTICAL CABLE SHUTTLE

FIELD OF THE DISCLOSURE

An example embodiment relates generally to fall protection systems and, more particularly, to fall protection locking systems.

BACKGROUND OF THE DISCLOSURE

Fall protection devices are essential for maintaining safety of users when climbing heights, whether for leisure or work purposes. In order to function effectively, such fall protection devices must be able to move freely along a guide member (cable) to allow for unrestricted vertical movement, while also allowing for fast and efficient activation of a braking system without causing damage to the guide member and to the user. The fall protection devices such as a locking system or device in a vertical cable shuttle allows the user to move up or down a vertical cable while being secured by a harness and lanyard. The locking system ensures that the user is protected from falling, even if he/she loses grip on the cable or become unconscious.

Applicant has identified various issues and challenges associated with current fall protection and locking devices. However, with creativity, hard work, and innovation, the present disclosure has addressed many of these problems through its methods and equipment.

SUMMARY OF THE DISCLOSURE

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a locking system for a vertical cable shuttle is provided. The locking system includes a housing defining a guide path and slideably attached to a guide member. The locking system also includes a braking element that is rotatably mounted within the housing. The braking element having a logarithmic spiral structure configured to rotate into engagement with a guide member during a fall. The logarithmic spiral structure of the braking element defines a constant slope angle for gripping of the guide member.

In some embodiments, the logarithmic spiral structure of the braking element facilitates constant braking performance for the guide member of varied diameters. In some embodiments, the constant slope angle of the logarithmic spiral structure of the braking element increases compression on the guide member. In some embodiments, the braking element is made up of a material selected from a group of materials such as alloy steel, high strength steel (HSS), or carbon steel.

In another example embodiment, a locking system for a vertical cable shuttle, is provided. The locking system includes a housing defining a guide path and slideably attached to a guide member. The locking system also includes a braking element that is rotatably mounted within the housing. The braking element having a logarithmic spiral structure configured to rotate into engagement with the guide member during a fall, and defines a constant slope angle for gripping of the guide member. Further, the braking element having a braking surface to provide contact surface area with the guide member during the fall. In some embodiments, the braking surface corresponds to an abrasive outer surface.

In some embodiments, the constant slope angle of the logarithmic spiral structure of the braking element increases compression on the guide member. In some embodiments, the braking element is biased against rotation due to gravity, ensuring that the braking element remains in position to grip the guide member during the fall. Further, a center of gravity of the braking element is located towards the braking surface of the braking element. In some embodiments, the braking surface provides corrosion free surface for the braking element and provides constant arresting distance with the guide member.

In another example embodiment, a locking system for a vertical cable shuttle is provided. The locking system includes a housing defining a guide path and slideably attached to a guide member. The locking system also includes a braking lever that is configured to engage the guide member. The locking system also includes a shock absorber fabricated along the braking lever. The shock absorber is configured to absorb shocks during a fall. In some embodiments, the shock absorber is in a double spiral shape, providing enhanced shock absorption properties. The locking system also includes a braking element that is configured independent from the braking lever. The braking element having a logarithmic spiral structure configured to actuate, via a spring, and to rotate into engagement with the guide member during the fall. The braking element defines a constant slope angle for gripping of the guide member. Further, the braking element having a braking surface to provide contact surface area with the guide member during the fall. In some embodiments, the braking surface corresponds to an abrasive outer surface.

In some embodiments, the constant slope angle of the logarithmic spiral structure of the braking element increases compression on the guide member. In some embodiments, the braking surface of the braking element defines a curvature that allows for gripping of the guide member during the fall. The braking surface of the braking element is subjected to surface treatment, such as sandblasting or other techniques, to achieve either an abrasive or non-abrasive surface, ensuring consistent and reliable gripping of the guide member. Further, the braking surface provides corrosion free surface for the braking element and provides constant arresting distance with the guide member.

In some embodiments, the braking element is biased against rotation due to gravity, ensuring that the braking element remains in position to grip the guide member during the fall. A center of gravity of the braking element is located towards the braking surface of the braking element. In some embodiment, the braking element is made up of a material selected from a group of materials such as alloy steel, high strength steel (HSS), or carbon steel.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
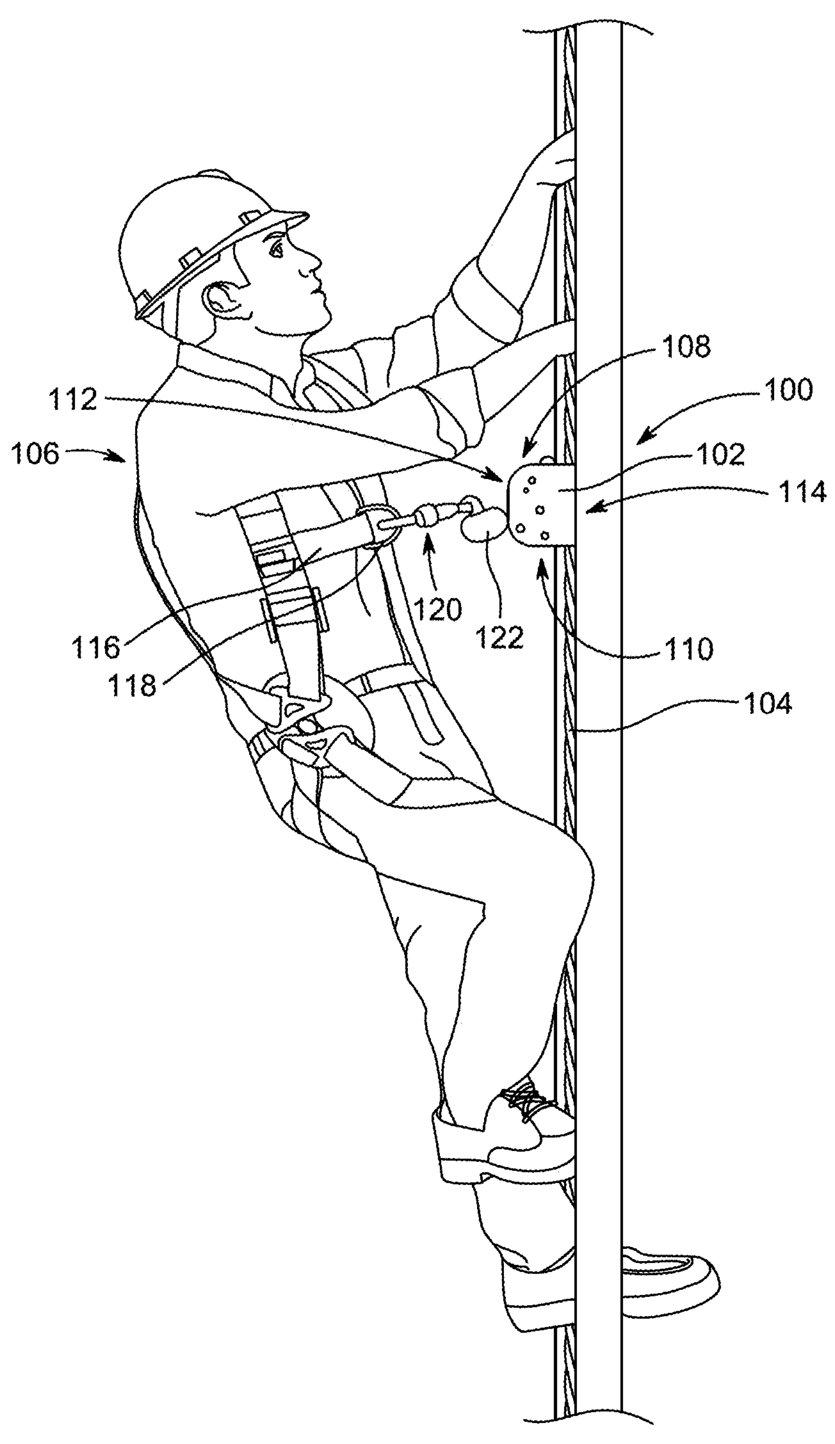
Figure 2A:
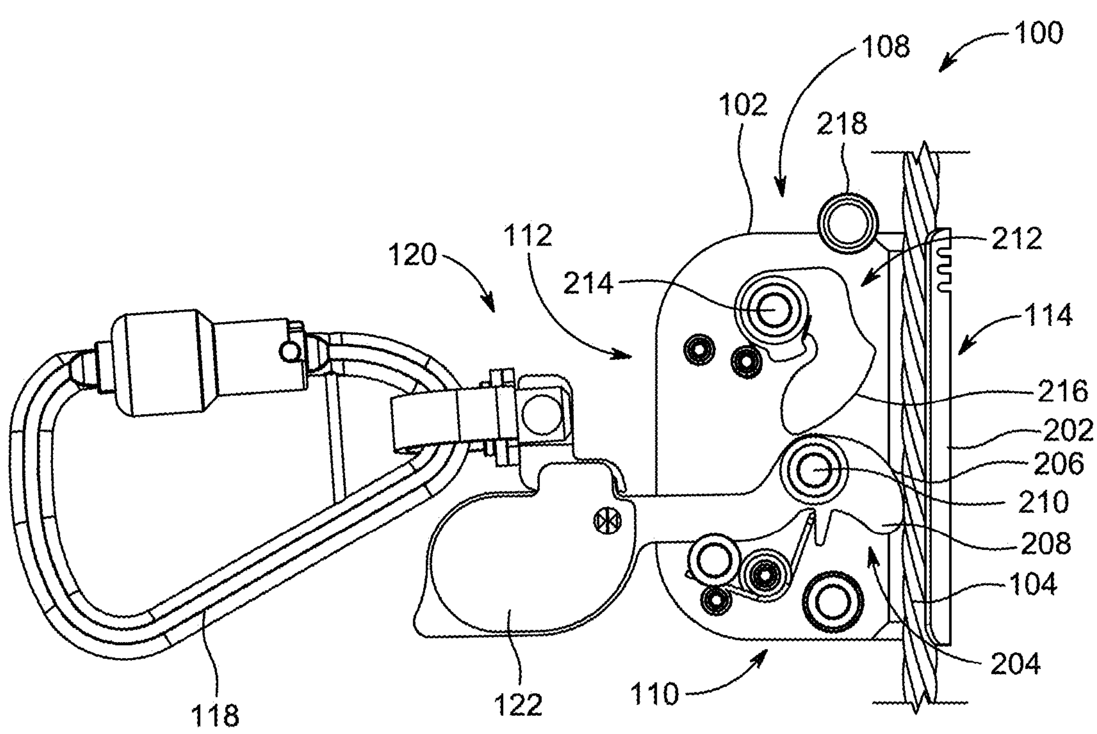
Figure 2B:
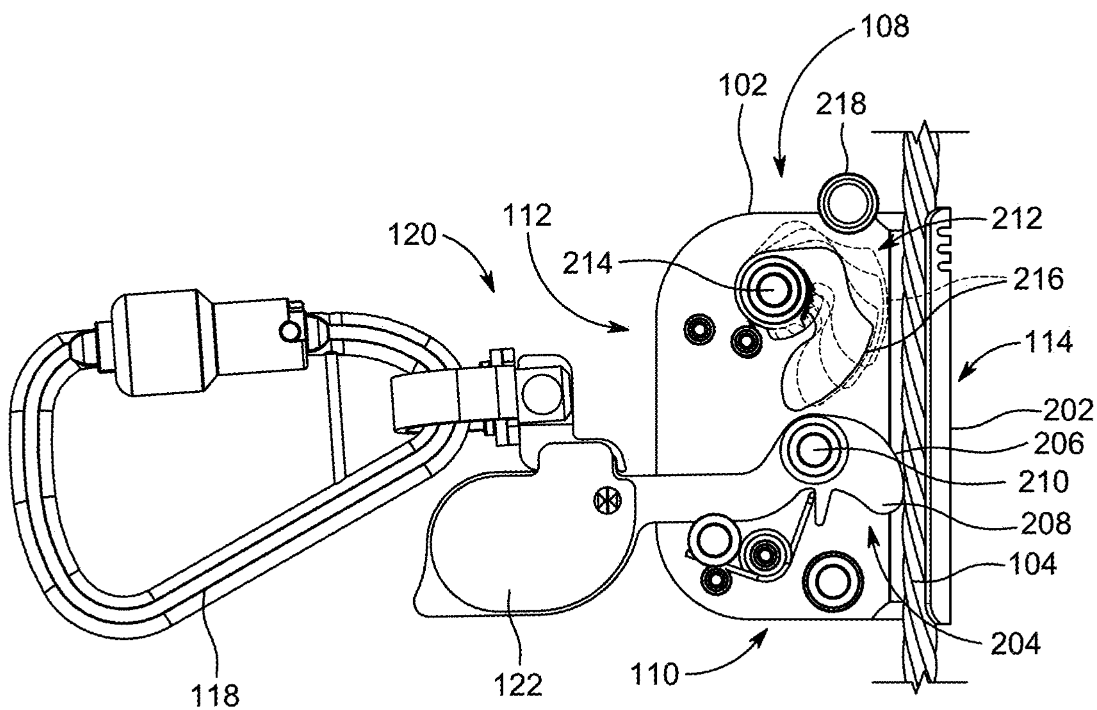
Figure 3A:
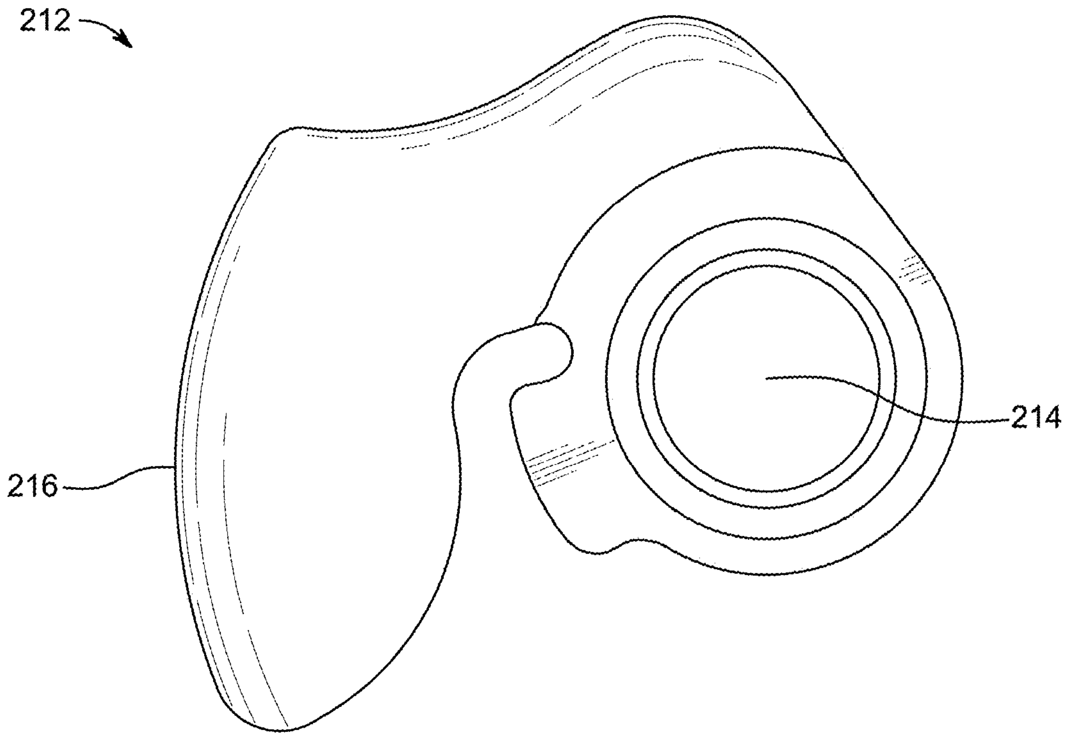
Figure 3B:
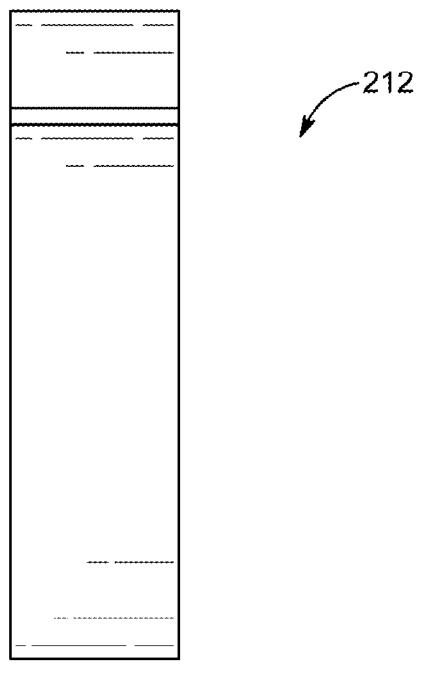
Figure 3C:
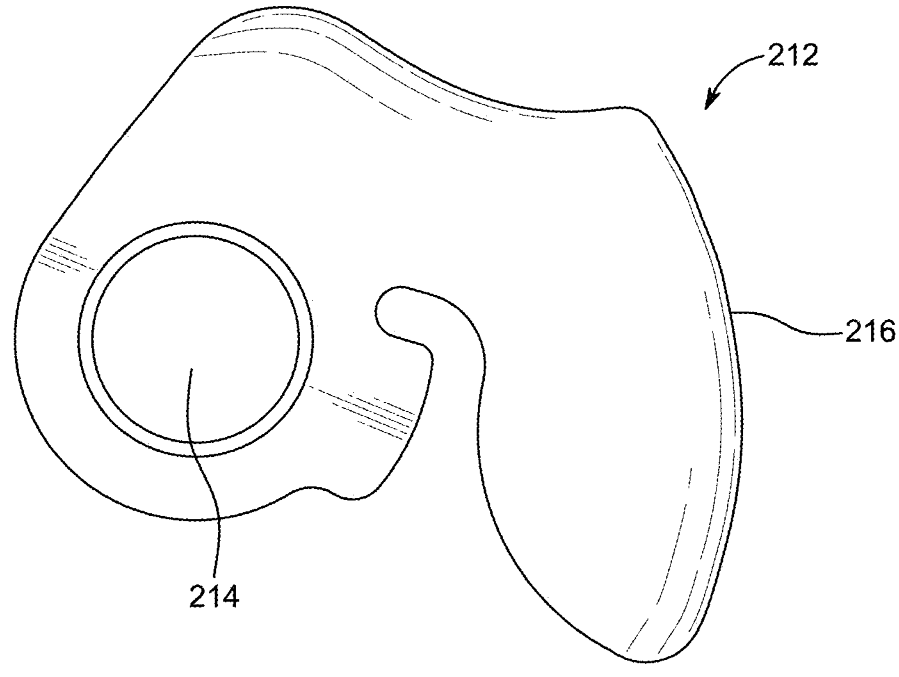
Figure 3D:
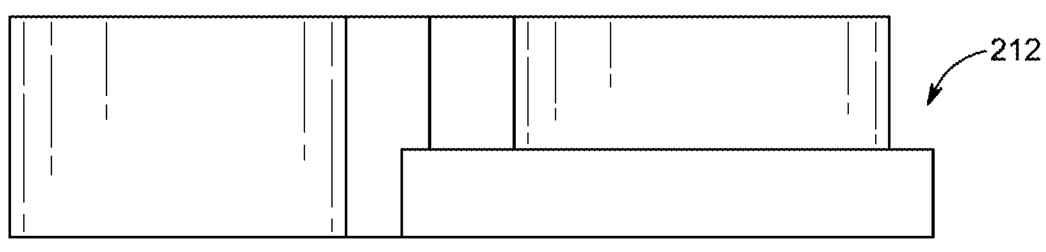
Figure 3E:
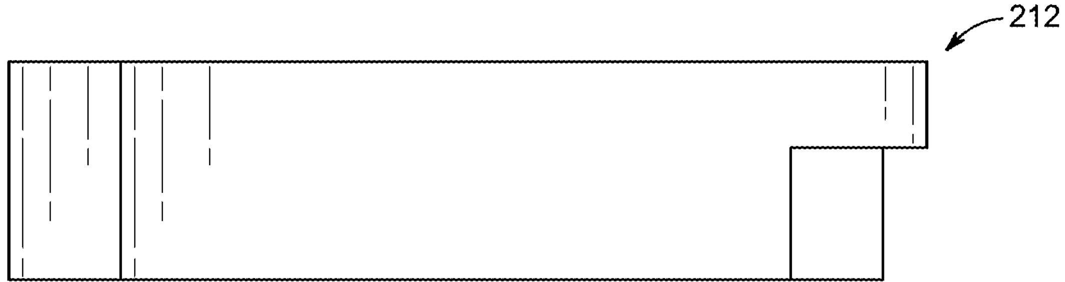
Figure 3F:
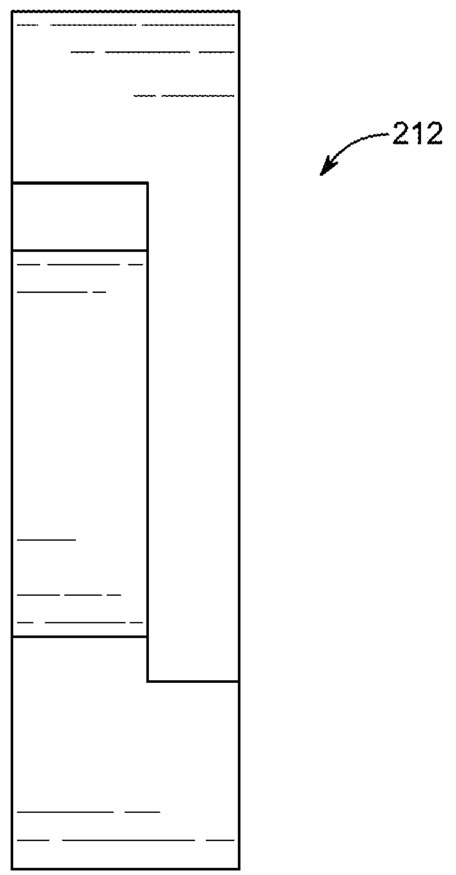
Figure 4A:
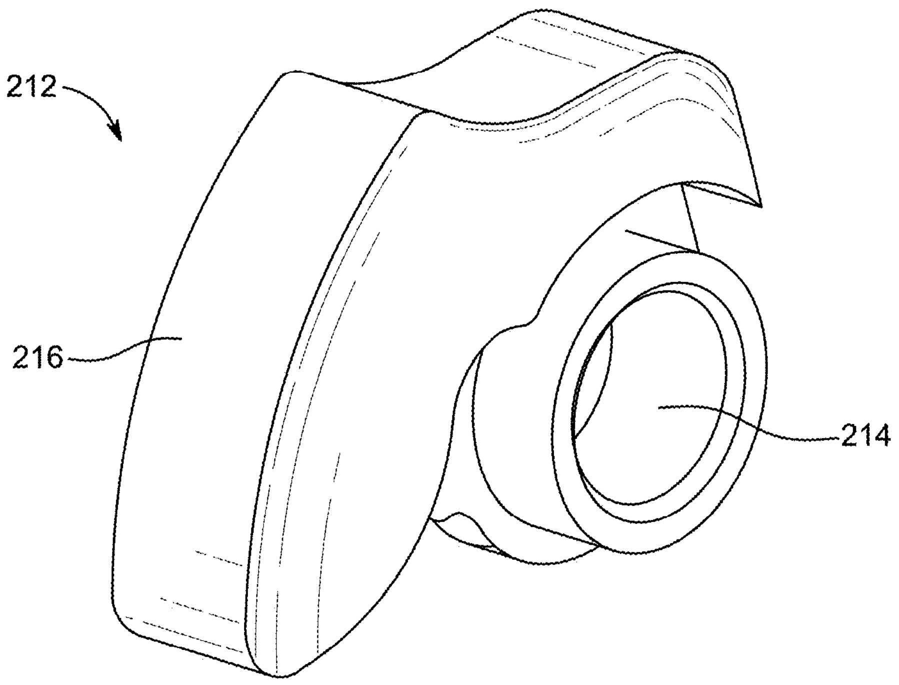
Figure 4B:
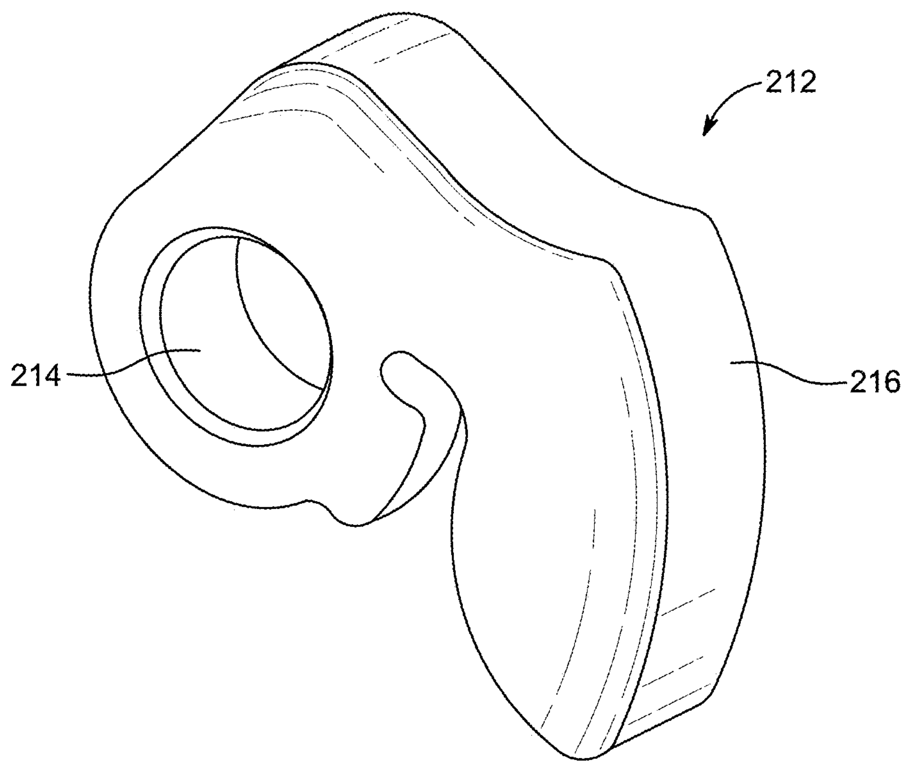
Figure 5:
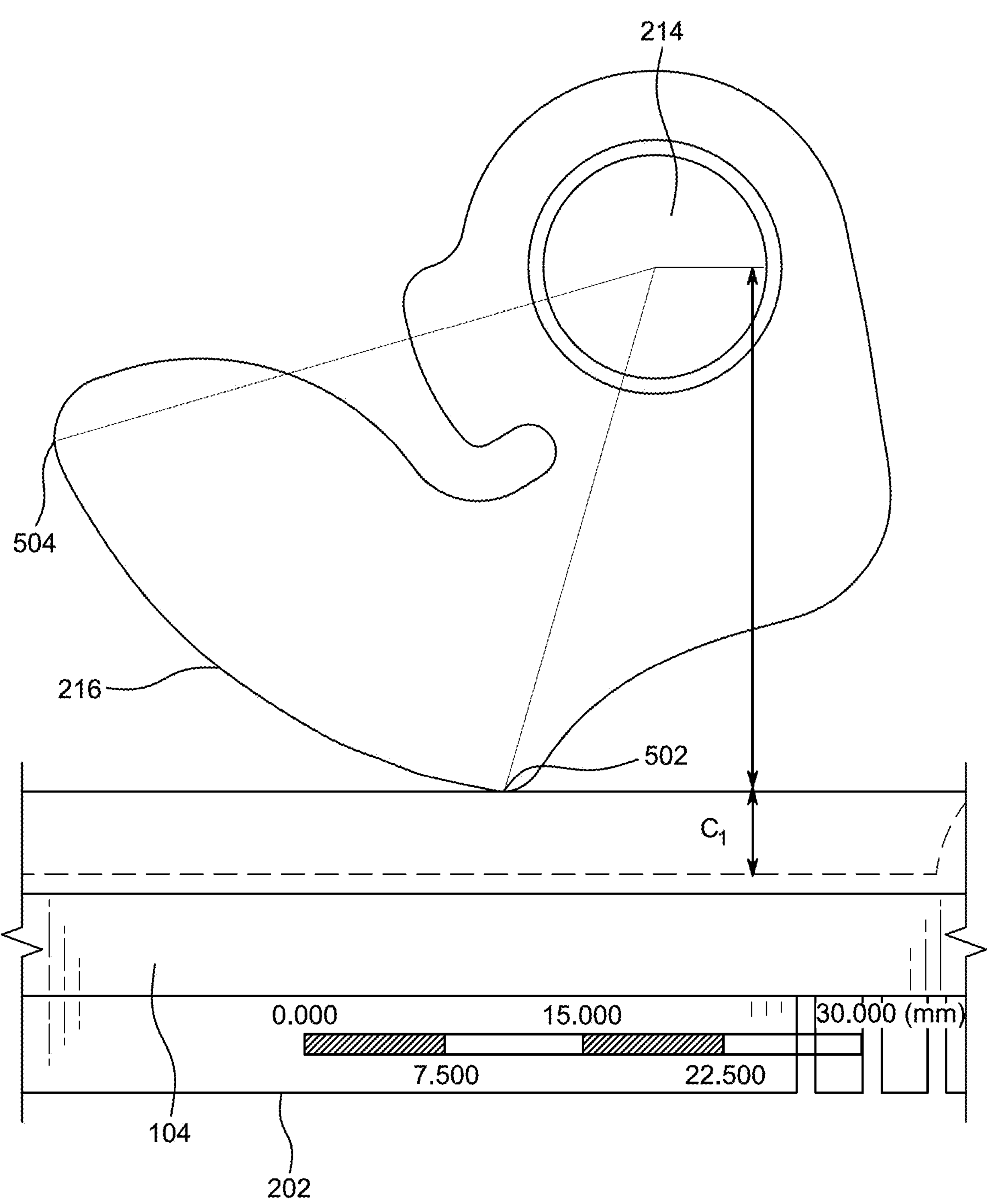
Figure 6:
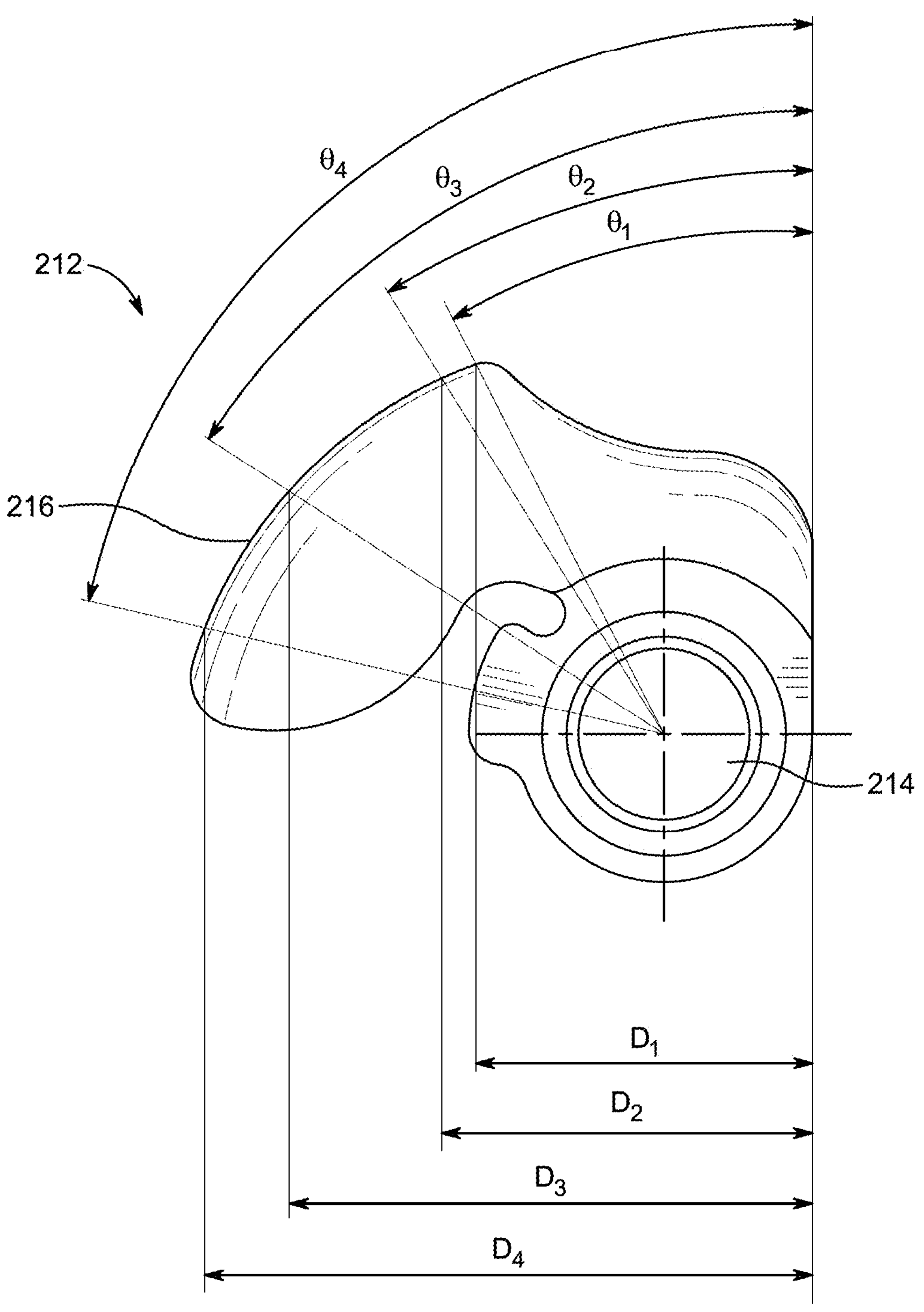
Figure 7:
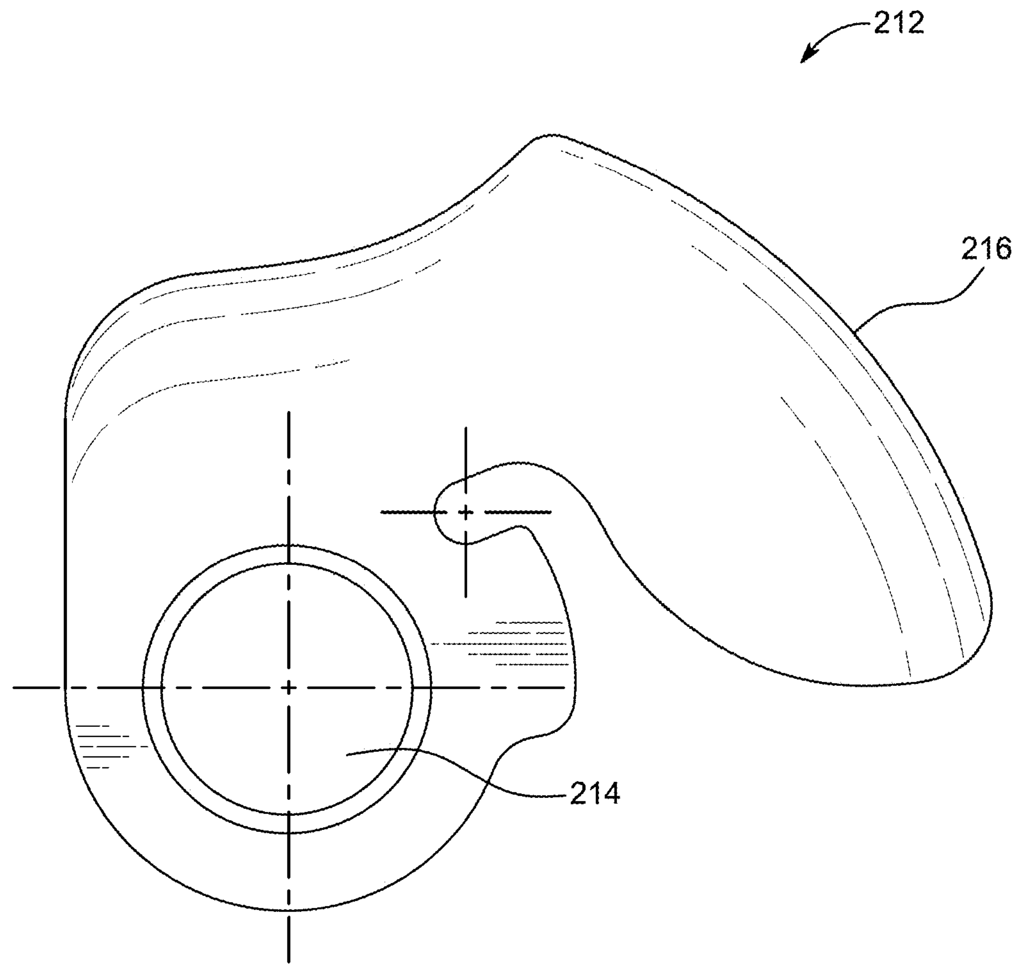

Having thus described certain example embodiments of the present disclosure in general terms, reference will hereinafter be made to the accompanying drawings, which are not necessarily drawn to scale, and wherein:

FIG. 1 illustrates an example embodiment of a locking system, in accordance with the present disclosure;

FIG. 2A is an interior view of an example embodiment of the locking system, in accordance with the present disclosure;

FIG. 2B is another interior view of the example embodiment of the locking system showing a movement of a braking element, in accordance with the present disclosure;

FIG. 3A is a side view of the braking element, in accordance with an example embodiment of the present disclosure;

FIG. 3B is a front view of the braking element, in accordance with an example embodiment of the present disclosure;

FIG. 3C is another side view of the braking element, in accordance with an example embodiment of the present disclosure;

FIG. 3D is a bottom view of the braking element, in accordance with an example embodiment of the present disclosure;

FIG. 3E is a top view of the braking element, in accordance with an example embodiment of the present disclosure;

FIG. 3F is a back view of the braking element, in accordance with an example embodiment of the present disclosure;

FIGS. 4A-4B are a perspective view of the braking element, in accordance with an example embodiment of the present disclosure;

FIG. 5 illustrates an axis of rotation of the braking element, in accordance with an example embodiment of the present disclosure;

FIG. 6 illustrates the braking element having outer surfaces at multiple angles with respect to a pivot point of the braking element, in accordance with an example embodiment of the present disclosure; and FIG. 7 illustrates the braking element showing a braking surface, in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various example locking systems to allow for effective operation with improved operation during fall instances. Various embodiments allow for a reduction in force against a guide member, such that the guide member is less likely to be worn and/or break during a fall instance. During the fall instance (e.g., an extended free fall), current fall arresting devices are fully reliant on the braking lever to appropriately move into contact with the guide member in order to slow and/or stop the movement of the fall arresting device along the guide member. As such, any failure of the braking lever can be catastrophic. The position of the braking lever may sometimes allow a user to accidentally cause the braking lever to operate incorrectly by providing a force against the braking lever that disengages the braking lever from the guide member. Various embodiments of the present disclosure allow for a secondary, "anti-panic" locking feature that operates independently of the braking lever and also engages with the guide member during the fall instance.

FIG. 1 illustrates an example embodiment of a locking system 100, in accordance with the present disclosure.

The locking system 100 may comprise a housing 102 defining a guide path (not shown) and is slideably attached to a guide member 104. As shown in FIG. 1, a user 106 may use the locking system 100 with the guide member 104, to perform one or more operations such as welding, cleaning etc., at heights. The housing 102 having an upper end 108, a lower end 110, a proximal end 112, and a distal end 114. The distal end 114 of the housing 102 is sized to slideably receive the guide member 104. In an example, the guide member 104 may be a rope, a cable, and/or the like. In some embodiments, the user 106 may connect the locking system 100 with a harness 116 via a carabiner 118 at a connecting portion 120.

Further, the locking system 100 may comprise a shock absorber 122 disposed at the proximal end 112 of the housing 102. In some example embodiments, the shock absorber 122 may undergo an elastic or plastic deformation during the fall. In some embodiments, the shock absorber 122 is in a double spiral shape, providing enhanced shock absorption properties. The operation of the locking system 100 using braking elements to hold the user 106 intact at a position during the fall will be described in greater detail in conjunction with FIGS. 2A-2B.

FIGS. 2A-2B are interior views of an example embodiment of the locking system 100, in accordance with the present disclosure. FIGS. 2A-2B are described in conjunction with FIG. 1.

As discussed above, the locking system 100 may comprise the housing 102 defining a guide path 202 and is slideably attached to the guide member 104. It may be noted that the distal end 114 of the housing 102, is an end proximate to the guide member 104 and is substantially curved such that it defines the guide path 202. In some examples, the distal end 114 is configured to partially surround the guide path 202. In other examples, the distal end 114 is configured to completely surround the guide path 202.

The locking system 100 may comprise a braking lever 204 having a braking surface 206. The braking lever 204 may be configured to engage with the guide member 104. In some embodiments, the braking lever 204 may be referred as a primary braking feature and the braking surface 206 corresponds to an outer surface of the primary braking feature. In some example embodiments, the braking surface 206 of the braking lever 204 may be an abrasive surface or non-abrasive surface. Further, the shock absorber 122 may be fabricated along the braking lever 204 and configured to absorb shocks during the fall. In some embodiments, the shock absorber 122 may include one or more hooks (not shown) configured to disengage from one another in an instance in which a force is applied at the connecting portion 120, and thus the force causes the rotation of the braking lever 204. It may be noted that a fall instance corresponds to an instance when a predetermined force on the guide member 104 is achieved, which is usually based on the user falling.

In some embodiments, a cover plate (not shown) may be secured to the housing 102 using one or more bolts, rivets, pins, or the like. For example, the rivets or pins are used to hold various components of the locking system 100 and may be attached at either end to the housing 102 and the cover plate respectively. In some embodiments, the housing 102 and the cover plate may form a unitary piece. In some embodiments, the cover plate may also have one or more guide wheel locking plate (not shown) disposed below the cover plate. In some embodiments, the guide wheel locking plate may be affixed in place via the same components used to secure the housing 102 and the cover plate (e.g., the guide wheel locking plate may be sandwiched between the cover plate and the housing 102 using one or more bolts, rivets, pins, or the like).

The braking lever 204 may comprise a top arm (not shown) and a bottom arm (not shown) that extend outwardly from the proximal end 112 of the housing 102. The top arm is connected to the shock absorber 122. In some embodiments, the top arm of the braking lever 204 may be configured to engage with the carabiner 118 such that the carabiner 118 does not rotate above the top arm of the braking lever 204. In one example, the carabiner 118 may engage the top arm instead of continuing to rotate in the clockwise direction. As such, the carabiner 118 does not negatively affect the force of the fall on the shock absorber 122. For example, in an instance, the top arm is absent from the locking system 100, the carabiner 118 may rotate beyond the location of the top arm and the force will not cause the shock absorber 122 to deform.

Further, the braking lever 204 may comprise a catching nose 208 fabricated towards the guide path 202 of the locking system 100. The catching nose 208 corresponds to a curved profile of the braking lever 204, that is configured to apply force on the guide member 104 when the fall instance occurs. Further, the braking lever 204 rotates on a pivot point 210. In the event of fall, the braking lever 204 is forced downwards, as the carabiner 118 connected to the user 106 is pulled downwards. In some embodiments, the catching nose 208 of the braking lever 204 moves upwards with reference to the pivot point 210, pushing the guide member 104 to hinder the vertical motion of the guide member 104 along the guide path 202.

Further, the locking system 100 may comprise a braking element 212 that is configured independent from the braking lever 204. The braking element 212 may be referred as a secondary braking feature, shown in FIGS. 3A-3F and 4A-4B. The braking element 212 may be mounted over a pivot point 214. The braking element 212 having a logarithmic spiral structure configured to rotate into engagement with the guide member 104 during the fall. The braking element 212 may be initiated by acceleration in the case of fall. In some embodiments, the braking element 212 may work as a backup brake for the locking system 100. The logarithmic spiral structure of the braking element 212 defines a constant slope angle for gripping of the guide member 104.

Further, the braking element 212 having a braking surface 216 to provide maximum contact surface area with the guide member during the fall. The braking surface 216 of the braking element 212 defines a curvature that allows for effective gripping of the guide member 104 during the fall. It may be noted that the braking surface 216 may act as a secondary braking surface of the locking system 100. In some embodiments, the braking element 212 may be activated instantaneously after the fall event occurs. The logarithmic spiral structure of the braking element 212 may rotate counter-clockwise as the acceleration of the locking system 100 increases during the fall. The braking element 212 may engage with the guide member 104 to further squeeze the guide member 104, as shown in FIG. 2B. The motion of the braking element 212 towards the guide member 104 does not have interference of the user 106. It can be noted that the operation of the braking element 212 may be solely actuated by a spring (not shown) in case of the fall. It may be noted that there is reduced effect of gravity over the braking element 212 during the fall, that enables the spring to actuate the braking element 212 and allows to engage the braking element 212 with the guide member 104. In some embodiments, the braking element 212 is biased against rotation due to gravity, ensuring that it remains in position to grip the guide member 104 during the fall. The center of gravity of the braking element 212 is located towards the braking surface 216, ensuring that it remains in position to grip the guide member 104 during the fall.

The braking surface 216 of the braking element 212 is subjected to surface treatment, such as sandblasting or other techniques, to achieve either an abrasive or non-abrasive surface, ensuring consistent and reliable gripping of the guide member 104. The braking surface 216 may provide corrosion free surface for the braking element 212 and provide constant arresting distance with the guide member 104. In some embodiments, the braking surface 216 may correspond to an abrasive outer surface. The abrasive outer surface may be achieved using sand blasting technique or other heat treatments, without departing from the scope of the disclosure.

In some example embodiments, the braking element 212 facilitates a self-deployment braking system that is activated when the braking lever 204 is interrupted. The logarithmic spiral structure provides an engagement surface to maintain a constant angle of contact with the guide member 104, as shown in FIG. 5. The constant angle of contact with the guide member 104 increases squeezing of the guide member 104 to slow the fall without rebounding to an opposite direction.

In some example embodiments, the braking element 212 may be made up of a material selected from a group of materials such as alloy steel, high strength steel (HSS), or carbon steel. In some example embodiments, the braking element 212 may be produced using computer numerical control (CNC) machining or laser cutting operations. It may be noted that the above-mentioned materials have been provided only for illustration purposes, without departing from the scope of the disclosure.

In an additional example embodiment, the locking system 100 may include a guide wheel 218 configured to freely travel along the guide member 104, such that guide member 104 may remain in the guide path 202 during the one or more operations. In some embodiments, a guide member assistor (not shown) may be installed on the guide member 104 to ensure the locking system 100 remains correctly engaged with the guide member 104 during the operations.

It will be apparent to one skilled in the art that the above-mentioned components of the locking system 100 have been provided only for illustration purposes, without departing from the scope of the disclosure. In some embodiments, the locking system 100 may be designed based on a maximum falling speed of the user during the one or more operations.

Referring now to FIG. 5, an axis of rotation of the braking element 212 is disclosed, according to an embodiment.

In some example embodiments, a starting point of the logarithmic spiral is calculated from following equations (1) and (2). Considering, a minimum working distance of 28.1 mm (11 mm rope/cable) and a maximum compression of 5 mm (6 mm left for rope). Sector angle (θ) is 58 degrees (1.012 rad).

$$k = \ln\left(\frac{D1 + C1}{D1}\right) \div \varphi_1 = \ln\left(\frac{28.1 + 5}{28.1}\right) \div 1.012 = 0.162 \tag{1}$$

$$a = D1 \div \cos(a\tan k) = 28.1 \div \cos\{a\tan(0.162)\} = 28.465 \tag{2}$$

Wherein, D1 is a distance of axis of rotation to maximum rope outer surface; and C1 is maximum compression.

Therefore, the contact area of the braking surface 216 of the braking element 212 increases when the braking surface 216 approaches the sector angle to maximize compression on the guide member 104.

In some embodiments, the constant slope angle of the logarithmic spiral structure of the braking element 212 increases compression on the guide member 104. The logarithmic spiral structure may form the sector angle (θ) with a reference origin from the pivot point 214. The sector angle (θ) may be referred as an angle of arc.

As shown in FIG. 5, the braking element 212 touches the guide member 104 at a starting point 502 and the sector angle (θ) may be formed from the starting point 502 to an end point 504 of the braking surface 216 of the braking element 212. In some example embodiments, the compression on the guide member 104 may start at the starting point 502 of the braking element 212 as the braking surface 216 might grip the guide member 104 while moving along a vertical traction of the guide member 104.

In some example embodiments, the compression on the guide member 104 at the starting point is 5 mm at the sector angle (θ) of 58 degrees. This allows the braking surface 216 to instantaneously grip the guide member 104 as soon as the braking lever 204 is actuated or the user loses the grip of the guide member 104.

FIG. 6 shows the braking element 212 having outer surfaces at multiple angles with respect to the pivot point 214. The braking surface 216 of the braking element 212 have slope angles between 27 degrees to 77 degrees with respect to the pivot point 214. As shown in above equation (1), the maximum compression on the guide member 104 is at a slope angle of 58 degrees. In some embodiments, the starting points also vary according to the slope angles. In various embodiments, the starting points vary between 23.73 mm to 42.75 mm with a tolerance of 0.05 mm, for the slope angles varying between 27 degrees to 77 degrees respectively. For example, the starting point of the logarithmic spiral of the braking element 212 at a slope angle of 57 degrees is 36.88 mm with tolerance of 0.05 mm. It will be apparent to one skilled in the pertinent art that the starting points of the braking surface 216 of the braking element 212 vary according to the slope angles with respect to the pivot point 214 of the braking element 212.

In some example embodiments, the braking element 212 may form multiple slope angles along with the braking surface 216. In some example embodiments, at least 4 slope angles, (θ1, θ2, θ3, and θ4) may be formed with distance of axis of rotation of the logarithmic spiral to maximum rope outer surface as D1, D2, D3, and D4. It can be noted that the slope angle to the distance of axis of rotation may correspond to diameter of an arc formed by the braking surface 216 with respect to the pivot point 214 of the braking element 212.

FIG. 7 illustrates the braking element 212 showing the braking surface 216, in accordance with an example embodiment of the present disclosure. FIG. 7 is described in conjunction with FIGS. 1-6

In some embodiments, the braking surface 216 of the braking element 212 may be prepared using sand blasting technique or other abrasive treatments. In one embodiment, the sand blasting of the braking surface 216 of the braking element 212 produces abrasiveness or roughness over the braking surface 216. In some embodiments, the abrasiveness of the braking surface 216 of the braking element 212 facilitates an efficient gripping of the guide member 104 along the guide path 202. As discussed above, the braking surface 216 of the braking element 212 is subjected to surface treatment, such as sandblasting or other techniques, to achieve either an abrasive or non-abrasive surface texture, ensuring consistent and reliable gripping of the guide member 104. It may be noted that a frictional force ensures such consistent and reliable grip of the braking surface 216 on the guide member 104, that may be achieved by the part material, surface material, or surface treatment. The braking surface 216 provides corrosion free surface for the braking element 212 and provides constant arresting distance with the guide member 104.

In various example embodiments, the braking element 212 excludes needs of complex 5-axis machining, which increase manufacturing cost. In another example embodiment, the braking element 212 may be produced in a laser cut blanks and then machined to a final shape. In some example embodiments, the sand blasting technique is suitable for serial production of the braking element 212. It can be noted that the serial production of the braking element 212 is easy to achieve and control. Additionally, there is no need to harden the material after production, therefore eliminating a production step. It may be noted that the sand blasting technique has been provided only for illustration purposes, without departing from the scope of the disclosure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A locking system for a vertical cable shuttle, the locking system comprising:

a housing defining a guide path and slideably attached to a guide member; and a braking element rotatably mounted within the housing, the braking element having a logarithmic spiral structure configured to rotate into engagement with the guide member during a fall, wherein the logarithmic spiral structure of the braking element defines a constant slope angle for gripping of the guide member, and wherein the braking element is configured independent from the guide member and is initiated by acceleration of the locking system during the fall such that the logarithmic spiral structure rotates as the acceleration of the locking system increases during the fall.

2. The locking system of claim 1, wherein the logarithmic spiral structure of the braking element facilitates constant braking performance for the guide member of varied diameters.

3. The locking system of claim 1, wherein the constant slope angle of the logarithmic spiral structure of the braking element increases compression on the guide member.

4. The locking system of claim 1, wherein the braking element is made up of alloy steel, high strength steel (HSS), or carbon steel.

5. A locking system for a vertical cable shuttle, the locking system comprising:

a housing defining a guide path and slideably attached to a guide member; and a braking element rotatably mounted within the housing, wherein the braking element is a logarithmic spiral structure configured to rotate into engagement with the guide member during a fall, and defines a constant slope angle for gripping of the guide member, the braking element having a braking surface to provide contact surface area with the guide member during the fall, and wherein the braking element is configured independent from the guide member and is initiated by acceleration of the locking system during the fall such that the logarithmic spiral structure rotates as the acceleration of the locking system increases during the fall.

6. The locking system of claim 5, wherein the constant slope angle of the logarithmic spiral structure of the braking element increases compression on the guide member.

7. The locking system of claim 5, wherein the braking element is made up of alloy steel, high strength steel (HSS), or carbon steel.

8. The locking system of claim 5, wherein the braking element is biased against rotation due to gravity, ensuring that the braking element remains in position to grip the guide member during the fall.

9. The locking system of claim 5, wherein a center of gravity of the braking element is located towards the braking surface of the braking element.

10. The locking system of claim 5, wherein the braking surface provides corrosion free surface for the braking element and provides constant arresting distance with the guide member.

11. The locking system of claim 5, wherein the braking surface corresponds to an abrasive outer surface.

12. A locking system for a vertical cable shuttle, the locking system comprising:

a housing defining a guide path and slideably attached to a guide member;

a braking lever configured to engage the guide member;

a shock absorber fabricated along the braking lever and configured to absorb shocks during a fall; and a braking element configured independent from the braking lever, wherein the braking element is a logarithmic spiral structure configured to actuate via a spring, and rotate into engagement with the guide member during the fall, and defines a constant slope angle for gripping of the guide member, the braking element having a braking surface to provide contact surface area with the guide member during the fall.

13. The locking system of claim 12, wherein the shock absorber is in a double spiral shape, providing enhanced shock absorption properties.

14. The locking system of claim 12, wherein the constant slope angle of the logarithmic spiral structure of the braking element increases compression on the guide member.

15. The locking system of claim 12, wherein the braking surface of the braking element defines a curvature that allows for gripping of the guide member during the fall.

16. The locking system of claim 12, wherein the braking element is biased against rotation due to gravity, ensuring that the braking element remains in position to grip the guide member during the fall.

17. The locking system of claim 12, wherein a center of gravity of the braking element is located towards the braking surface of the braking element.

18. The locking system of claim 12, wherein the braking element is made up of alloy steel, high strength steel (HSS), or carbon steel.

19. The locking system of claim 12, wherein the braking surface corresponds to an abrasive outer surface.

20. The locking system of claim 12, wherein the logarithmic spiral structure of the braking element facilitates constant braking performance for the guide member of varied diameters.

* * * * *